O. ANDERSON.
LOCKING DEVICE FOR FLUID MEASURING APPARATUS.
APPLICATION FILED NOV. 11, 1916.
1,260,293.
Patented Mar. 26, 1918.
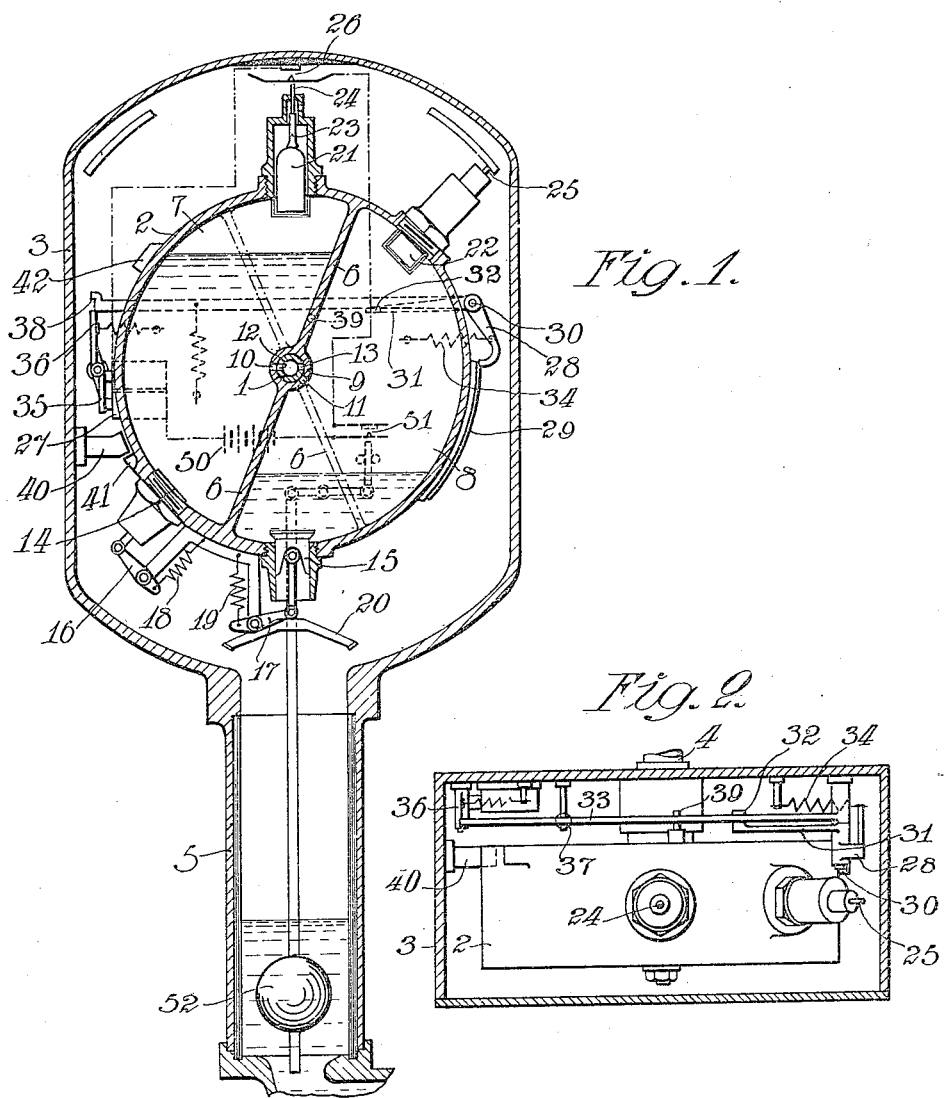
Witness
E. J. Sheehy
Inventor
Oscar Anderson
by James J. Sheehy & Co.

UNITED STATES PATENT OFFICE.

OSCAR ANDERSON, OF RÅSUNDA, SWEDEN.

LOCKING DEVICE FOR FLUID-MEASURING APPARATUS.

1,260,293.   Specification of Letters Patent.   Patented Mar. 26, 1918.

Application filed November 11, 1916. Serial No. 130,927.

*To all whom it may concern:*

Be it known that I, OSCAR ANDERSON, a citizen of the Kingdom of Sweden, residing at Råsunda, Sweden, have invented new and useful Improvements in Locking Devices for Fluid-Measuring Apparatus, of which the following is a specification.

This invention relates to an automatically operating fluid measuring apparatus, as for instance fluid measuring apparatus of the kind described in my Patent No. 1,201,229, dated October 17, 1916.

In said apparatus the rotatable measuring vessel is temporarily locked by means of a pawl engaging the measuring vessel or any member connected therewith and rigidly attached to the armature of an electromagnet. This arrangement presents, however, the inconvenience, that the electromagnet has to be rather powerful, in order to be capable of moving the pawl out of engagement with the vessel, since the latter, owing to its tendency of turning, retains the pawl rather forcibly.

The object of the invention is to prevent the said inconveniences by providing an electromagnetically operated locking device for the aforesaid purpose, in which an electromagnet of a relatively small power is required.

A further object is to provide a locking device of the type specified, in which a spring-actuated or weighted lever is disposed between the pawl and the electromagnet, said lever being locked by the non-attracted armature of the electromagnet and then, after the attraction of the armature, moved under the influence of the spring or the weight, so as to bring the pawl out of engagement with the measuring vessel.

These objects are attained by the embodiment of my invention described in the following specification with reference to the accompanying drawing, in which—

Figure 1 is a vertical section of a fluid measuring apparatus provided with a locking device constructed according to the invention. Fig. 2 is a horizontal section of the casing of said apparatus with the measuring vessel viewed from above.

Referring to the drawing, 1 is a hollow shaft supporting a rotary measuring vessel 2 inclosed in a stationary casing 3. The shaft 1 is passed through one side wall of the casing and connected with an outer supply conduit 4. The lower portion of the casing is formed with a compartment 5 adapted to take up the fluid measured off and connected with a consumption conduit.

The measuring vessel 2 consists of a drum-formed receptacle divided into two compartments 7 and 8 of equal size by means of radial partitions 6. The hub 9 of the vessel is provided with two apertures 10 and 11, each of which is connected with one of the compartments 7, 8, and the hollow shaft is provided with two corresponding apertures 12 and 13. Each compartment has an outlet valve 14 and 15, whose stem is connected with a double-armed lever 16 and 17 respectively actuated by a spring 18 and 19 respectively which tends to close the valve. Placed below the measuring vessel is a beveled guiding piece 20 adapted to engage the levers 16, 17 so as to open the valves.

Each compartment 7, 8 contains a float 21 and 22 respectively, which is connected with a pin 23 (one pin only being shown in the drawing) serving as an air valve and supporting outside the vessel a projection 24 and 25 respectively adapted, in a certain position of the float, to close a contact 26 inserted in the circuit of an electromagnet 27. The electromagnet is attached to the wall of the casing 3 and adapted to control the locking device of the measuring vessel. Inserted in the circuit of said electromagnet are an electric source of power 50 and a contact 51, which latter is so controlled by a float 52 contained in the compartment 5, that the contact is closed, when the said compartment is empty.

The locking device of the measuring vessel consists of a pawl 28 adapted to engage a rib 29 provided on the outer side of the casing 2. The pawl is formed as a bell crank lever pivotally mounted on a pin 30, one arm 31 of the lever being provided with a lateral projection 32 bearing against the lower side of a lever 33 mounted on the pin 30. The pawl 28 is actuated by a spring 34 tending to hold the pawl in engagement with the rib 29.

The free end of the lever 33 bears on a spring-actuated rod 36 rigidly connected with the pivotally mounted armature 35 of the electromagnet 27, the lever 33 being actuated by a spring 37 tending to move the lever downward. The said free end of the lever 33 is hook-shaped and provided with a shoulder 38 adapted, after the attraction of the armature 35, to bear against the rod 36. The vessel 2 is provided with a projection 39 serving to move the lever 33 back to its raised position.

An abutment 40 secured to the inner side of the casing 3 coöperates with two abutments 41 and 42 disposed on the vessel 2, so as to limit the rotary movement of the vessel in both directions.

The apparatus described above operates as follows:

In the position of the vessel 2 shown in the drawing liquid flows from the hollow shaft 1 out of the apertures 12 and 10 into the compartment 7. At the same time the compartment 8 is emptied through the opened valve 15. When the compartment 7 is filled, the float 21 is raised, so as to close the corresponding air valve and the contact 26. As soon as the liquid flowing out of the compartment 8 has passed into the compartment 5, the float 52 is lowered thus closing the contact 51, so that the electromagnet 27 is excited and the armature 35 attracted. On account thereof the lever 33 is released from the rod 36 and moved downward by the spring 37, until the shoulder 38 strikes the rod 36. Owing thereto the pawl 28 is moved outward against the action of the spring 34 thus releasing the vessel 2, which actuated by the weight of the liquid contained in the compartment 7 is rotated in a counter-clockwise manner, until the abutment 42 strikes the abutment 40. During this movement the raised projection 24 is removed from the contact 26, which, consequently, is opened thus breaking the circuit of the electromagnet 27. The projection 39 moves the lever back to the raised position in which the rod 36 under the influence of the spring is moved under the lever 33, so as to retain the latter in the raised position. During the movement of the vessel the pawl 28 slides along the rib 29. When the abutment 42 strikes the abutment 40, the pawl catches behind the lower end of the rib 29 thereby locking the vessel in the new position. In this position the partitions 6 are located as shown with dotted lines in Fig. 1. The aperture 11 of the hub 9 registers now with the aperture 13 of the hollow shaft, so that liquid can enter the compartment 8. The outlet valve 14 of the compartment 7 is opened by the beveled guide 20, and the liquid contained in said compartment flows out past the valve. The projection 25 assumes now the position just below the contact 26.

When the compartment 8 has been filled and the compartments 7 and 5 have been emptied, the play described above is reiterated with the exception, that the vessel 2 turns back to the position shown in the drawing.

The length of the lever 33 is so chosen, that the pressure exerted by the lever on the rod 36 can be overcome even in large measuring vessels by a feeble electromagnet.

Having now described my invention, what I claim as new and desire to secure by Letters Patent is:

In locking means for fluid measuring apparatus, the combination of a casing, a float therein, a measuring vessel movable through a part of a circle in the casing and having compartments and also having means for supplying said compartments with liquid and discharging the same of their contents, an exterior rib on the said vessel, a pawl mounted in the casing and arranged to engage said rib, a lever through which said pawl is moved to disengage it from the rib on the vessel, a spring for moving said lever in one direction, a projection on the vessel for moving the lever against the action of said spring, a float in each compartment of the vessel, circuit-closing means complementary to each of said floats, a circuit-closer constructed and arranged to be closed by said means alternately, a second circuit closer constructed and connected to be closed by raising of the float in the casing, an electro-magnetic device and a source of electric energy arranged in a normally open circuit with said circuit closers, an armature complementary to said electro-magnetic device, a rod fixed to and movable with said armature, and a spring for moving said rod when the electro-magnetic device is deënergized; the lever and the rod being constructed and arranged to release the lever when the electro-magnetic device is energized and then limit the movement of the lever.

In testimony whereof I have signed my name.

OSCAR ANDERSON.